United States Patent Office 3,826,667
Patented July 30, 1974

---

3,826,667
MAGNETITE COATING COMPOSITION
Ernest S. Cohen, Silver Spring, Md., and Roland H. Shubert, Reston, Va., assignors to the United States of America as represented by the Secretary of the Interior
No Drawing. Filed Nov. 30, 1972, Ser. No. 310,721
Int. Cl. C08h 9/00, 17/04
U.S. Cl. 106—259                                          7 Claims

ABSTRACT OF THE DISCLOSURE

A magnetite coating composition made by reacting an aqueous solution of ferric and ferrous salts with ammonium hydroxide, heating the resulting product to convert it to magnetite, adding a siccative oil to produce a dispersion of magnetite in oil and adding a solvent thinner to produce a coating composition suitable as a paint or a printing ink.

BACKGROUND OF INVENTION

The use of magnetite as a paint pigment is well known. In one method for preparing such pigment, magnetite is finely ground to a particle size of 1.0 to 40 microns, incorporated into an oil base and admixed with drying oils and thinners and, if desired, other common paint or ink ingredients well known to the art. The other common method for preparing the pigment is by precipitating iron salts with alkali and then heating the precipitated mass to produce magnetite having a particle size of 0.10 to 1.25 microns. Here too, the pigment must be incorporated into an oil base and then formulated into a paint or printing ink. These methods are described in detail in Kirk-Othmer, "Encyclopedia of Chemical Technology," 2nd ed., vol. 15, p. 545, Interscience, publishers, New York, and in U.S. Pat. 2,631,085.

A copending commonly assigned patent application, Ser. No. 275,382, discloses and claims a method of producing magnetic fluids (ferro fluids) by peptization techniques. In that process, an aqueous solution of iron salts is reacted with a base, such as ammonium hydroxide, to produce a precipitate of colloidal-sized magnetite particles. The precipitated particles are coated with an absorbed layer of a dispersing agent, such as the ammonium salt of oleic acid, which is then decomposed to the acid form by heating. Oleic acid coated particles are then dispersed in a carrier liquid, such as kerosene, to form a stable magnetic fluid.

SUMMARY OF THE INVENTION

This invention relates to improved magnetite coating compositions and to methods for producing the same. More particularly, it relates to a method for producing a magnetic paint or printing ink composition comprising extremely fine particles of magnetite wherein the magnetite wherein the magnetite is prepared and dispersed in a siccative oil in situ and then thinned to the desired consistency with a solvent.

Hence, it is an object of our invention to produce coating compositions containing a magnetite pigment of extremely small particle size.

A specific object of our invention is to produce magnetic paint compositions in which the magnetite pigment particles are of such a size as to essentially preclude settling.

DETAILED DESCRIPTION OF THE INVENTION

Paints and inks formed from precipitated magnetite particles have high covering power due to their fine size. Because of the magnetite properties of the composition, a magnetite paint is valuable as an undercoating for steel and iron structures due to its superior adhesion and excellent spreading properties. As is well known, galvenized surfaces require special preparation for painting because ordinary paint compositions do not adhere well. Magnetite paint has superior adhesion and can be employed as a primer coat or final coat. Magnetite printing inks are useful not only where a magnetic ink is required for special purposes, but can be used as a general purpose ink where its magnetic properties would not interfere.

Prior methods for preparing paints and inks from precipitated magnetite require incorporating the separated precipitated pigment into an oil base and then formulating the paint or ink. We have found that a magnetite pigment can be prepared in a simple manner from iron salts, readily incorporated in situ in a siccative oil base and the resultant pigment-oil past thinned with solvent to form the coating composition. Other components well known to the paint and printing ink arts, may be added if desired.

In preparing our coating compositions, we first rapidly precipitate an aqueous solution of mixed ferrous and ferric iron salts using excess ammonium hydroxide. Particle size of the resulting mixed iron oxides or hydroxides is extremely small; the bulk of the particles being of true colloidal dimension on the order of 100 Angstroms or less in diameter. Thus our compositions distinguish sharply in pigment particle size from those produced in conventional fashion. Magnetite pigments produced by grinding typically display a particle size from about 100 to about 4000 times as large as those produced in our process while magnetite pigments produced by ordinary precipitation techniques range from about 10 to 100 times greater in particle diameter. Thus our coating compositions display far greater stability in suspension than do ordinary compositions as well as presenting economies of manufacture.

Heating the precipitated iron oxides to moderate temperatures, generally within the range of 50 to 95° C., results in the formation or crystallization of magnetite. Transformation of the precipitated iron oxides to magnetite is easily observable by the intense black color which rapidly develops as the suspension is heated within the above temperature range. It is necessary that the ratio of ferrous to ferric ions in the aqueous solution be controlled within the range whereat magnetite will form upon precipitation and heating. It is not necessary that this ratio be maintained precisely at that equivalent to an ideal magnetite composition, or $FeO \cdot Fe_2O_3$. Some variation on either side of this ideal composition can be tolerated and still produce acceptable magnetite pigment.

After transformation of the precipitated iron oxides to magnetite is complete we add a siccative oil, such as linseed oil, to the aqueous suspension of magnetite particles. It is important that ammonia be present in the aqueous mixture at this stage. Ammonia reacts in solution with components of the siccative oil to form water soluble ammonium soaps which then coat the individual magnetite particles thus preventing further crystal growth or physical agglomeration. Amount of siccative oil added is governed by the ratio of pigment to oil desired in the coating composition. We prefer to add all of the siccative oil at this stage but a portion, at least about one-third of the total, may be added to coat the magnetite particles and the remainder may be added later. Heating is then continued until ammonia evolution ceases and a temperature level of at least about 90° to 100° C. is reached. Continued heating in this fashion acts to decompose the ammonia-siccative oil compound, driving off the ammonia and resulting in a coagulation of the magnetite-siccative oil mixture. This agglomerate can then be separated from the water, which contains ammonium salts, by decantation. It is preferred to then wash the agglomerated mass with additional hot water to extract remaining soluble salts.

The washed agglomerate is then heated to temperatures above 100° C. but below the decomposition temperature of the siccative oil to drive off any remaining water. Drying temperatures in the range of about 120 to 150° C.

are appropriate. After drying, volatile solvents or thinners are added in an amount determined by the characteristics of the coating composition desired. The thinner or solvent used must be compatible with the siccative oil; volatile organic solvents such as turpentine and petroleum naphthas are preferred. Other conventional paint or ink components, such as drying accelerators or catalysts, may also be added to the formulation.

The following example illustrates our invention. All parts therein are by weight.

Two parts of $FeCl_3 \cdot 6H_2O$ and one part of $FeCl_2 \cdot 4H_2O$ were dissolved in about 17.5 parts of water. Ferrous and ferric oxides and hydroxides were precipitated by rapidly adding an excess of concentrated ammonium hydroxide with stirring. Excess ferrous iron was present in the solution as compared to the ratio of ferrous to ferric iron in magnetite but some oxidation of ferrous iron to the ferric state was expected to occur since the reaction was carried out in open vessels. The precipitate was rapidly heated, again with stirring, to a temperature of about 90 to 95° C. During this period of heating, the characteristic deep black color of magnetite rapidly developed.

About 1.5 parts of raw linseed oil was then added with agitation. Heating was continued until no odor of ammonia was detectable in the vapors. By this time, the linseed oil and magnetite had agglomerated to form a thick paste and a water phase. The water phase was separated by decantation and discarded. The agglomerated oil phase was jet black in color, had a thick honey-like or gummy consistency and was composed of magnetite particles coated with linseed oil. This agglomerate was then washed with hot water to extract remaining soluble salts and was then heated to a temperature above 100° C. to drive off any remaining water. Thereafter, the pigment mass was allowed to cool and was thinned with turpentine to form a paint of suitable body.

The paint of the example was then applied to a piece of wood using a brush. It had good coverage, a highly satisfactory color and was attracted to a magnet. Similarly, a piece of galvanized stove pipe and a piece of black iron pipe which was rusty in spots, were painted with good results.

While ferric and ferrous chlorides are shown in the example, other water soluble iron salts can be substituted. Industrial waste products containing iron salts, such as a waste pickle liquor from steel mills, which contains copperas, may be employed. To convert ferrous to ferric ions where this is required, as in the case of waste pickle liquor, an oxidizing agent may be added. For example, sodium chlorate or hydrogen peroxide may be employed in an amount sufficient to produce a ratio of $Fe^{III}$ to $Fe^{II}$ approximating that of magnetite. Other siccative oils, known to the art may be substituted instead of raw linseed oil, such as tung oil, perilla oil, dehydrated castor oil, etc.

Having now described our invention, we claim:

1. A method for preparing a magnetite coating composition such as a paint or printing ink, which comprises dissolving ferric and ferrous salts in water, the ratio of the ferric to ferrous salt approximating that of magnetite, rapidly adding ammonium hydroxide in excess of that required to precipitate iron hydroxides and hydrated oxides, heating the reaction mass to a temperature of up to about 95° C. to convert the precipitate to magnetite, adding a siccative oil to the reaction mass containing excess ammonium hydroxide and continuing the heating to above the boiling temperature to drive off any unreacted ammonium hydroxide whereby a thick oil or gummy phase and an aqueous phase is produced, removing any water from the gummy phase, and adding a volatile solvent thereto to form a coating composition.

2. The method of claim 1 wherein the ferric and ferrous salts are chlorides.

3. The method of claim 1 wherein the ferric and ferrous salts are sulfates.

4. The method of claim 2 wherein the ferrous salts are waste pickle liquor and the ferric salts are produced therein by oxidation in situ.

5. The method of claim 1 wherein the siccative oil is linseed oil.

6. The method of claim 5 wherein the coating composition is a paint and wherein the solvent comprises turpentine.

7. A paint composition produced by the method of claim 6.

References Cited

UNITED STATES PATENTS

| | | | |
|---|---|---|---|
| 3,082,171 | 3/1963 | Shoemaker | 106—259 |
| 2,696,426 | 12/1954 | Marcot | 106—304 |

OTHER REFERENCES

Chem. Abst. 55:26812d, 1961.

Condensed Chemical Dictionary, 6th ed., 1961, pp. 1181–1182.

Chem. Abst., 50:127211.

THEODORE MORRIS, Primary Examiner

U.S. Cl. X.R.

106—27, 304